(12) United States Patent
Suman et al.

(10) Patent No.: US 12,473,890 B2
(45) Date of Patent: Nov. 18, 2025

(54) AUXILIARY CONTROLLER FOR WIND TURBINE CONTROL SYSTEM

(71) Applicant: VESTAS WIND SYSTEMS A/S, Aarhus (DK)

(72) Inventors: Rishi Suman, Aarhus (DK); Karthik Krishnan Jamuna, Trivandrum (IN)

(73) Assignee: VESTAS WIND SYSTEMS A/S, Aarhus (DK)

( * ) Notice: Subject to any disclaimer, the term of this patent is extended or adjusted under 35 U.S.C. 154(b) by 0 days.

(21) Appl. No.: 18/686,803

(22) PCT Filed: Aug. 25, 2022

(86) PCT No.: PCT/DK2022/050174
§ 371 (c)(1),
(2) Date: Feb. 26, 2024

(87) PCT Pub. No.: WO2023/025366
PCT Pub. Date: Mar. 2, 2023

(65) Prior Publication Data
US 2025/0129765 A1    Apr. 24, 2025

(30) Foreign Application Priority Data
Aug. 26, 2021 (IN) .............................. 202111038712
Oct. 8, 2021 (DK) .............................. PA202170499

(51) Int. Cl.
*F03D 7/04* (2006.01)
*F03D 7/02* (2006.01)

(52) U.S. Cl.
CPC ............ *F03D 7/042* (2013.01); *F03D 7/0224* (2013.01); *F03D 7/0276* (2013.01)

(58) Field of Classification Search
CPC ............................... F03D 7/042; F03D 7/0224
See application file for complete search history.

(56) References Cited

U.S. PATENT DOCUMENTS

2003/0099546 A1* 5/2003 Stiesdal .................. F03D 80/00
                                                                    416/228
2015/0337806 A1  11/2015 Damgaard et al.
(Continued)

FOREIGN PATENT DOCUMENTS

EP         2610485 A2     7/2013
EP         3067557 A1     9/2016
(Continued)

OTHER PUBLICATIONS

PCT International Search Report and Written Opinion of The International Searching Authority for Application PCT/DK2022/050174 dated Dec. 5, 2022 (May 12, 2022).
(Continued)

*Primary Examiner* — Brian O Peters
(74) *Attorney, Agent, or Firm* — Patterson + Sheridan, LLP; Gero G. McClellan

(57) ABSTRACT

The disclosure relates to a method, as well as a related wind turbine and computer program product, for use with a wind turbine comprising a wind turbine controller. The method comprises determining the wind turbine to be in a first operational state, and operating a control system of the wind turbine using the wind turbine controller. The method further comprises determining the wind turbine to be in a second operational state, and operating the control system using an auxiliary controller. Operating the control system using the auxiliary controller comprises receiving a first control signal for the control system from the wind turbine controller, transmitting a feedback signal to the wind turbine controller in accordance with the first control signal, and transmitting a second control signal to the control system as a substitute for the first control signal.

20 Claims, 6 Drawing Sheets

(56) References Cited

U.S. PATENT DOCUMENTS

2017/0248124 A1    8/2017   Hammerum et al.
2019/0010924 A1    1/2019   Theopold et al.

FOREIGN PATENT DOCUMENTS

WO    2019238189 A1    12/2019
WO    2020125901 A1    6/2020

OTHER PUBLICATIONS

Danish Patent and Trademark Office, 1st Technical Examination including The Search Report and Search Opinion for Application PA 2021 70499 dated Mar. 25, 2022.

* cited by examiner

AUXILIARY CONTROLLER FOR WIND TURBINE CONTROL SYSTEM

FIELD

The present disclosure relates to controlling power production of a wind turbine, and more specifically, to controlling power production of the wind turbine using an auxiliary controller in combination with the wind turbine controller.

BACKGROUND

During the operational lifetime of a wind turbine, various components of the wind turbine will wear and may require replacement. Further, with advancements in wind turbine technology, it may be possible to improve the performance and/or extend the operational lifetime of the wind turbine by upgrading the components of the wind turbine. However, it may be prohibitively costly to adapt a wind turbine controller of an existing wind turbine installation to accommodate the new components.

SUMMARY

According to one aspect described herein, a method is disclosed for use with a wind turbine comprising a wind turbine controller. The method comprises determining the wind turbine to be in a first operational state, and during the first operational state, operating a control system of the wind turbine using the wind turbine controller. The method further comprises determining the wind turbine to be in a second operational state, and during the second operational state, operating the control system using an auxiliary controller. Operating the control system using the auxiliary controller comprises receiving a first control signal for the control system from the wind turbine controller, transmitting a feedback signal to the wind turbine controller in accordance with the first control signal, and transmitting a second control signal to the control system as a substitute for the first control signal.

Beneficially, using the method allows the auxiliary controller to augment the wind turbine controller in the control of power production, while permitting the wind turbine controller to continue operation in its present configuration. The method thus enables upgrading components in the wind turbine, e.g., retrofitting components into existing wind turbine installations, without a need to replace the wind turbine controller and/or alter the operation of the wind turbine controller. In some cases, the auxiliary controller is arranged to handle e particular functionalities requiring control implementations different from those of the wind turbine controller, whereas the existing wind turbine controller is permitted to handle the remaining functionalities.

According to another aspect described herein, a wind turbine comprises a rotor having one or more rotor blades, a generator coupled with the rotor, a control system configured to alter one or more operational parameters affecting power generation of the wind turbine, a wind turbine controller, and an auxiliary controller arranged between the wind turbine controller and the control system. The auxiliary controller is configured to receive, from the wind turbine controller, a first control signal for the control system. The auxiliary controller is further configured to determine the wind turbine to be in a first operational state, and during the first operational state of the wind turbine, output the first control signal to operate the control system. The auxiliary controller is further configured to determine the wind turbine to be in a second operational state, and during the second operational state of the wind turbine: transmit a feedback signal to the wind turbine controller in accordance with the first control signal, and output a second control signal as a substitute for the first control signal to operate the control system.

Beneficially, the wind turbine allows the auxiliary controller to augment the wind turbine controller in the control of power production, while permitting the wind turbine controller to continue operation in its present configuration. The wind turbine may thus permit upgrading components, e.g., retrofitting components into existing wind turbine installations, without a need to replace the wind turbine controller and/or alter the operation of the wind turbine controller. In some cases, the auxiliary controller is arranged to handle particular functionalities requiring control implementations different from those of the wind turbine controller, whereas the existing wind turbine controller is permitted to handle the remaining functionalities.

According to another aspect described herein, a computer program product comprises comprising computer-readable code, which when executed by one or more computer processors of an auxiliary controller of a wind turbine, performs an operation comprising receiving, from a wind turbine controller, a first control signal for a control system of the wind turbine. The operation further comprises determining the wind turbine to be in a first operational state, and during the first operational state of the wind turbine, outputting the first control signal so that the wind turbine controller operates the control system. The operation further comprises determining the wind turbine to be in a second operational state, and during the second operational state of the wind turbine: transmitting a feedback signal to the wind turbine controller in accordance with the first control signal, and outputting a second control signal as a substitute for the first control signal to operate the control system.

Beneficially, the computer program product allows the auxiliary controller to augment the wind turbine controller in the control of power production, while permitting the wind turbine controller to continue operation in its present configuration. The computer program product thus enables upgrading components in the wind turbine, e.g., retrofitting components into existing wind turbine installations, without a need to replace the wind turbine controller and/or alter the operation of the wind turbine controller. In some cases, the auxiliary controller is arranged to handle particular functionalities requiring control implementations different from those of the wind turbine controller, whereas the existing wind turbine controller is permitted to handle the remaining functionalities.

To facilitate understanding, identical reference numerals have been used, where possible, to designate identical elements that are common to the figures. It is contemplated that elements disclosed in one embodiment may be beneficially utilized on other embodiments without specific recitation.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclo

DETAILED DESCRIPTION

Figure 1:
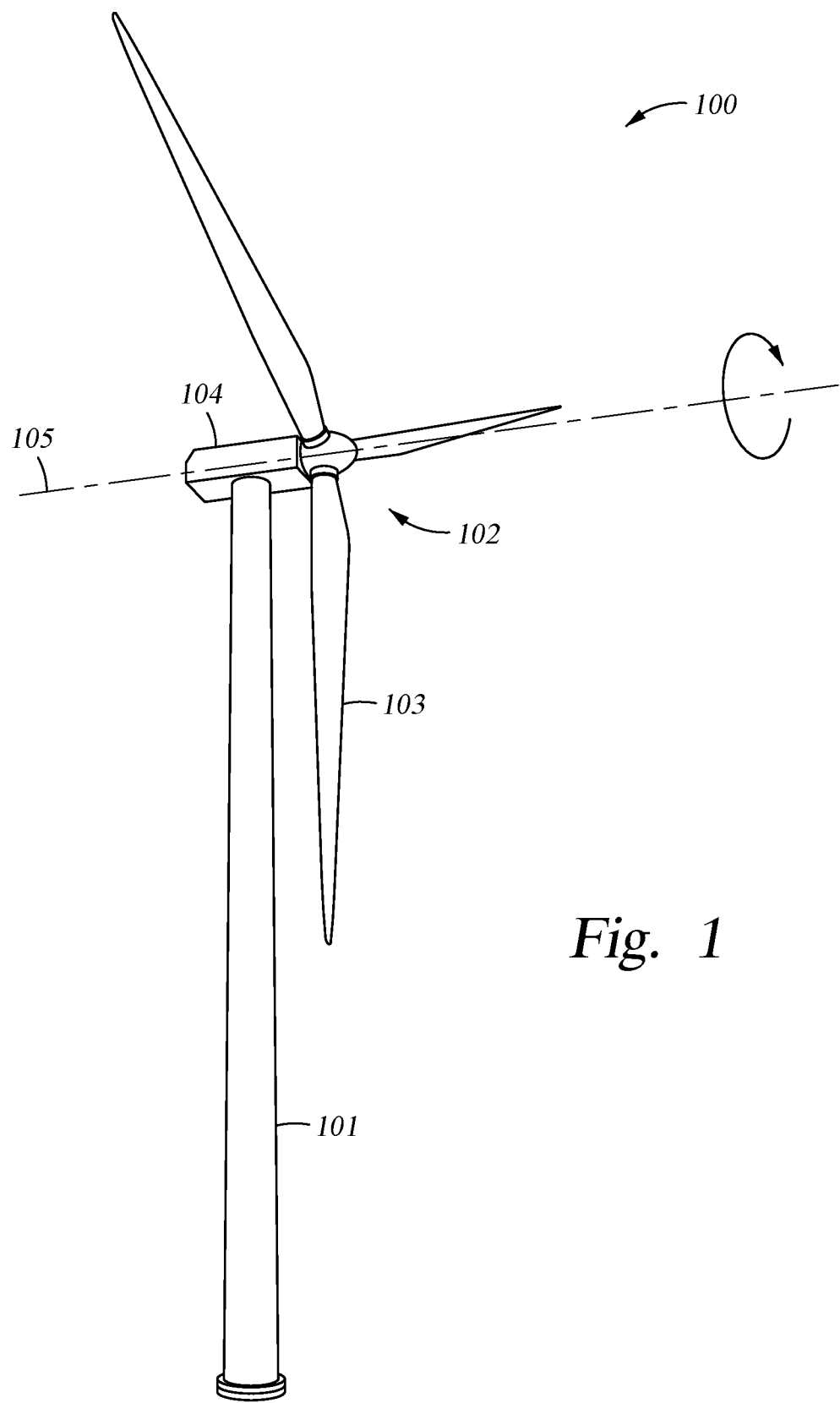
- FIG. 1 illustrates a wind turbine, according to one or more embodiments.

Aspects described herein include a method for use with a wind turbine comprising a wind turbine controller. The method comprises determining the wind turbine to be in a first operational state of the wind turbine, and during the first operational state, operating a control system of the wind turbine using the wind turbine controller. The method further comprises, determining the wind turbine to be in a second operational state, and during the second operational state, operating the control system using an auxiliary controller. Operating the control system using the auxiliary controller comprises receiving a first control signal for the control system from the wind turbine controller, transmitting a feedback signal to the wind turbine controller in accordance with the first control signal, and transmitting a second control signal to the control system as a substitute for the first control signal.

A control system of a wind turbine comprises a number of controller elements in the form of sub-control systems and dedicated controllers. A dedicated controller may be a single controller or a collection of controllers arranged for a given control function.

In some embodiments, the control system comprises a pitch control system. In the first operational state, the wind turbine controller controls the pitch control system. In the second operational state, the auxiliary controller controls the pitch control system while the wind turbine controller controls other aspects of the wind turbine, such as an output power and/or a rotor speed.

In some embodiments, the first operational state is full-load operation of the wind turbine, and the second operational state is partial-load operation of the wind turbine. The feedback signal may be a synthetic feedback signal that is generated by the auxiliary controller. The auxiliary controller may apply one or more parameters (such as a control voltage, a pitch moment, and a pitch rate) as well as a pitch reference to a pitch model.

In some embodiments, the second operational state has pitch modulation enabled, such that the second control signal comprises a pitch modulation component. The feedback signal is received from the control system and provided to the wind turbine controller. In some embodiments, the pitch modulation values having a zero average so that the second feedback signal provided to the wind turbine controller may be the same as the first feedback signal received from the control system.

Beneficially, the method allows the auxiliary controller to augment the wind turbine controller in the control of power production, while permitting the wind turbine controller to continue operation in its present configuration. The method thus enables upgrading components in the wind turbine, e.g., retrofitting components into existing wind turbine installations without a need to replace and/or alter the operation of the wind turbine controller. In some cases, the auxiliary controller is arranged to handle particular functionalities requiring control implementations different from those of the wind turbine controller, whereas the existing wind turbine controller is permitted to handle the remaining functionalities.

FIG. 1 illustrates a wind turbine 100, which may also be referred to as a wind turbine generator (WTG). The wind turbine 100 comprises a tower 101 and a rotor 102 with at least one rotor blade 103. Although three (3) rotor blades 103 are shown, any other numbers of rotor blades 103 are contemplated. The rotor 102 is connected to a nacelle 104 that is mounted on top of the tower 101. The rotor 102 drives an electrical generator that is situated inside the nacelle 104. The rotor 102 is rotatable around a rotor axis 105 by action of the wind. The wind-induced rotational energy of the rotor blade(s) 103 is transferred via one or more shafts and/or gearing to the electrical generator. Thus, the wind turbine 100 is capable of converting kinetic energy of the wind into mechanical energy by means of the rotor blade(s) 103 and, subsequently, into electric power by means of the electrical generator.

The wind turbine 100 may further comprise a power converter comprising a rectifier that converts alternating current (AC) power from the electrical generator into direct current (DC) power, and an inverter that converts the DC power into an AC power having desired characteristics. The AC power having the desired characteristics may be injected into a utility grid.

The wind turbine 100 further comprises one or more controllers that operate a respective one or more components of the wind turbine 100 to generate power corresponding to a power request. Using one example configuration of a controller, the rotor blade(s) 103 may be pitched in order to alter the aerodynamic properties of the rotor blade(s) 103, e.g., in order to maximize uptake of the wind energy. The rotor blade(s) 103 may also be pitched to ensure that the rotor blade(s) 103 are not subjected to excessive loads in the presence of strong winds, and to damp various oscillations such as edgewise oscillations.

In some embodiments, the controller(s) are implemented within a general controller of the wind turbine 100 (also referred to herein as a "wind turbine controller"). In other embodiments, one or more of the controller(s) are implemented as separate control elements, such as a dedicated pitch controller that communicates with the wind turbine controller. The wind turbine controller is typically an original controller of the wind turbine control system arranged for controlling the wind turbine as originally put in operation.

In some embodiments, a controller transmits control signals (or "pitch signals") to a pitch control system to collectively and/or individually pitch the rotor blade(s) 103. In some embodiments, the pitch control system comprises actuators, such as hydraulic actuators, for individually pitching the rotor blade(s) 103 responsive to the pitch signal.

Figure 2:
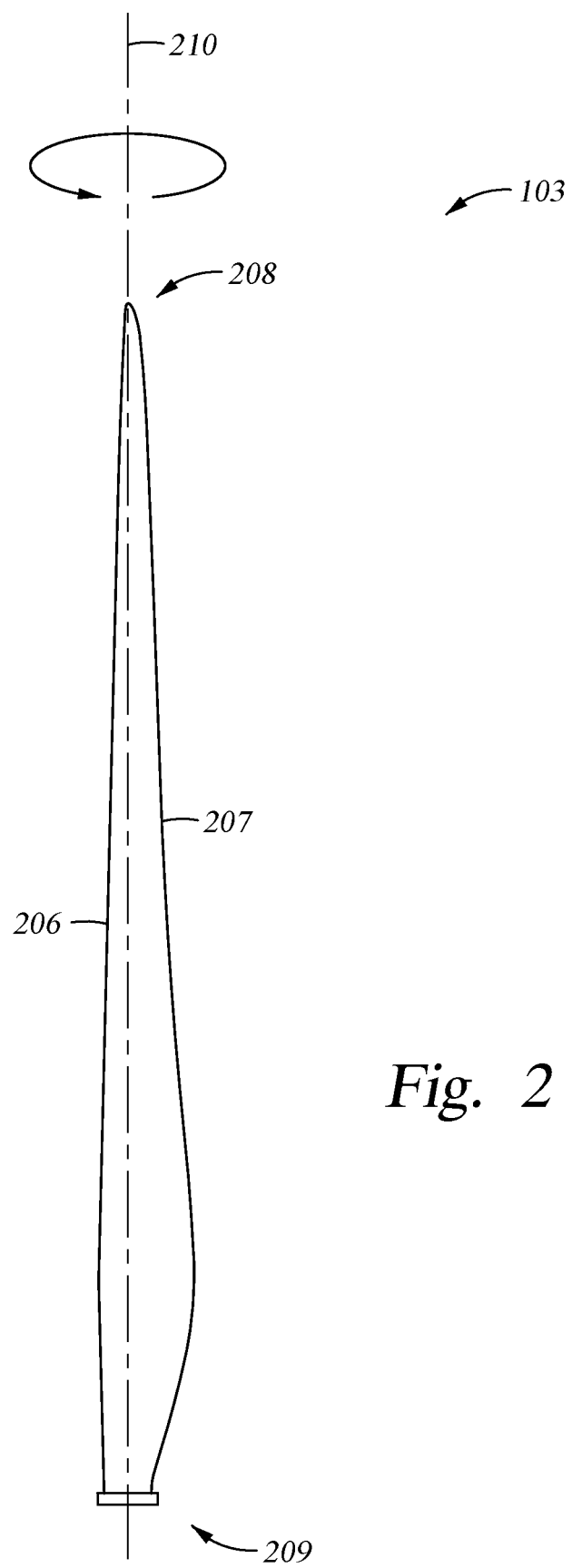
FIG. 2 illustrates pitching a rotor blade, according to one or more embodiments.

FIG. 2 illustrates pitching a rotor blade 103. The rotor blade 103 comprises a leading edge 206, a trailing edge 207, a tip 208, and a root 209. The rotor blade 103 has an elastic center that is typically closer to the leading edge 206 than to the trailing edge 207 along a longitudinal axis of the rotor blade 103. During operation, the rotor blade 103 may be pitched for various reasons: to maintain a desired power output of the wind turbine (e.g., during full-load operation), to achieve an optimal aerodynamic efficiency for the current environmental conditions (e.g., during partial-load operation of the wind turbine), to damp oscillations occurring in the rotor blade 103, and so forth. During pitching, the rotor blade 103 rotates around a pitch axis 210, which may substantially correspond to the longitudinal axis of the rotor blade 103.

Figure 3:
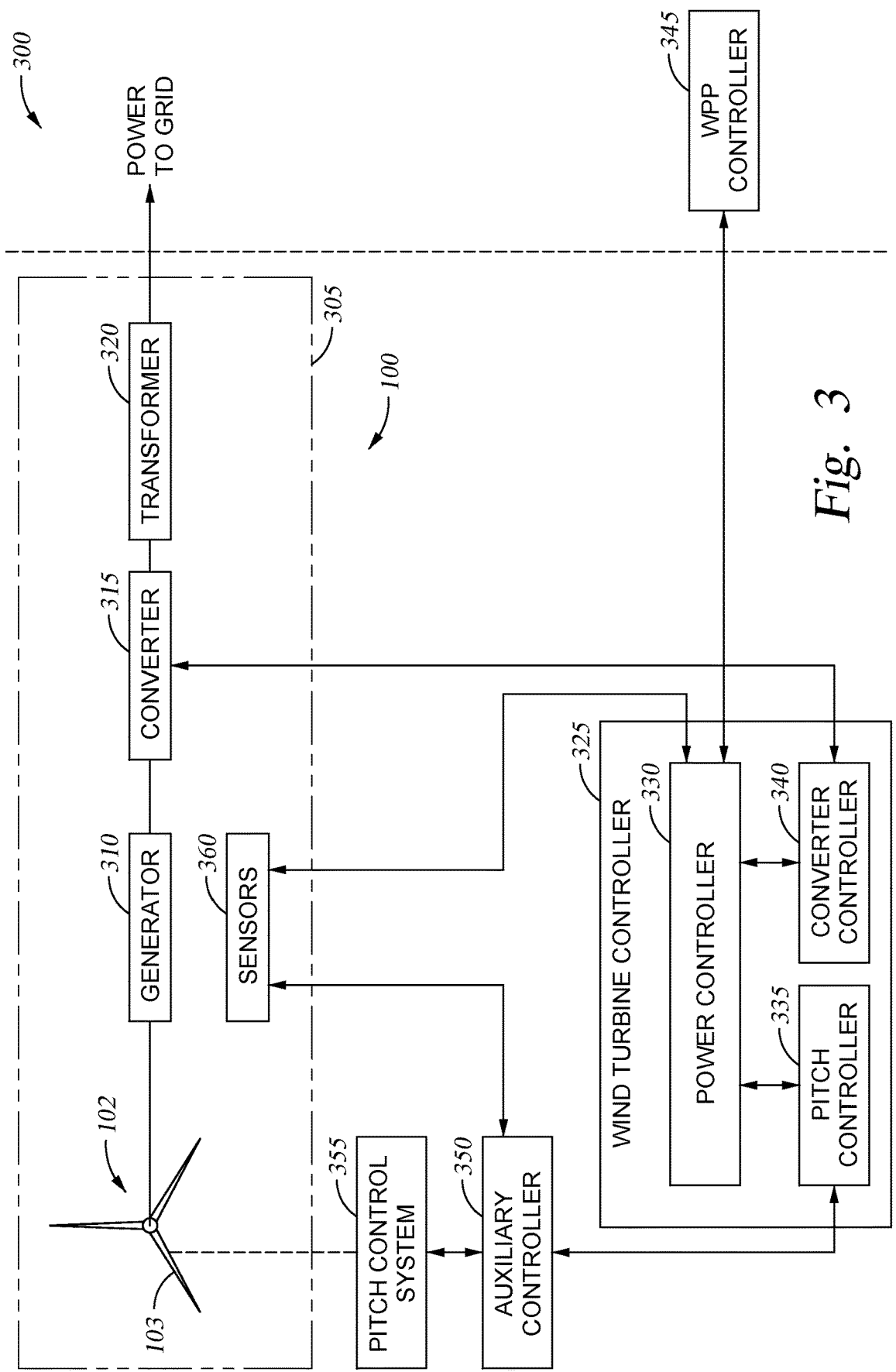
FIG. 3 is a block diagram of a wind turbine having an auxiliary controller arranged between a wind turbine controller and a control system, according to one or more embodiments.

FIG. 3 is a block diagram 300 of a wind turbine 100 having an auxiliary controller 350 arranged between a wind turbine controller 325 and a control system. A power system 305 of the wind turbine 100 comprises various power generation and conditioning components. As shown, the power system 305 includes the rotor 102 mechanically coupled to a generator 310. Electrical power from the generator 310 is provided to a converter 315, and the converted electrical power is provided to a transformer 320 to step up the voltage of the electrical power for delivery to a grid, e.g., at a point of common coupling. Other configurations of the power system 305, including additional components and functionality, are also contemplated.

In some embodiments, one or both of the rotor 102 and the rotor blades 103 are retrofitted to the wind turbine 100 (i.e., replacing a rotor and/or rotor blades of an existing installation of the wind turbine 100). The rotor 102 and/or the rotor blades 103 may be of different type as the replaced components. In some cases, the rotor 102 and/or the rotor blades 103 may be more efficient and/or support greater power production of the wind turbine 100.

A wind turbine controller 325 controls various components of the power system 305 to provide electrical power to the grid according to one or more references. In some embodiments, the wind turbine 100 is included with one or more other wind turbines in a wind power plant (WPP; also referred to as a "wind farm"), and a WPP controller 345 provides one or more references to be fulfilled by the wind turbine controller 325.

The wind turbine controller 325 comprises one or more computer processors and a memory, each of which may be implemented in any suitable form. Some examples of the one or more computer processors include a general purpose microprocessor, a controller, an application-specific integrated circuit (ASIC), and so forth. Some examples of the memory may include a variety of computer-readable media selected for their size, relative performance, or other capabilities: volatile and/or non-volatile media, removable and/or non-removable media, etc. The wind turbine controller 325 is communicatively coupled with the WPP controller 345 via any suitable means, and may include one or more wireline, wireless, and/or optical connections.

The wind turbine controller 325 comprises multiple controllers providing respective functionality to the wind turbine controller 325. As shown, the wind turbine controller 325 includes a power controller 330, a pitch controller 335, and a converter controller 340. In some embodiments, each of the power controller 330, the pitch controller 335, and the converter controller 340 comprises a respective one or more computer processors that are communicatively coupled with each other. Other configurations of the wind turbine controller 325 are also contemplated, such as multiple controllers integrated together and implemented by a single computer processor, controllers for additional components such as a transformer controller, and so forth.

In some embodiments, the power controller 330 receives one or more power references from the WPP controller 345, such as an active power reference and/or a reactive power reference. The wind turbine controller 325 may further receive sensor data from one or more sensors 360. The sensor data may include one or more environmental conditions (e.g., wind speed, wind direction) and/or one or more operational conditions (e.g., a speed of the rotor 102, one or more power parameters, a pitch position of the rotor blades 103). In some embodiments, the sensor data comprises feedback from the power system 305.

To fulfill the one or more power references given the current environmental condition(s) and operational condition(s), the power controller 330 generates control signals (e.g., references) for the pitch controller 335 and the converter controller 340. In this way, the power controller 330 may adapt the control signals based on the sensor data from the sensors 360. The pitch controller 335 generates control signals for operating the pitch control system 355 (also described as "pitch signals"), and the converter controller 340 generates control signals for operating the converter 315. In some embodiments, the pitch controller 335 comprises a pitch position controller and a pitch valve manager that generates a pitch rate to control pitch valves. In some embodiments, the converter controller 340 generates pulse width modulation (PWM) signals that control the characteristics of the AC power output by the converter 315 (e.g., voltage, frequency).

As described above, the pitch control system 355 may collectively and/or individually pitch the rotor blade(s) 103. In some embodiments, the pitch control system 355 comprises actuators, such as hydraulic actuators, for individually pitching the rotor blade(s) 103 responsive to the pitch signals. In some embodiments, the pitch control system 355 comprises proportional pitch valves.

In conventional implementations of a wind turbine, the controller(s) of the wind turbine controller 325 may communicate the control signals directly to the corresponding components or to the control systems. For example, the pitch controller 335 may conventionally communicate pitch signals directly to the pitch control system 355.

In various embodiments described herein, an auxiliary controller 350 is arranged between the wind turbine controller 325 and the pitch control system 355. The term "auxiliary" indicates that the auxiliary controller 350 may be added to an existing, operational installation of the wind turbine 100. The auxiliary controller 350 comprises one or more computer processors and a memory, each of which may be implemented in any suitable form. The auxiliary controller may be a retrofit controller.

The auxiliary controller 350 provides control signals to the pitch control system 355 based on an operational state of the wind turbine 100. In some embodiments, the auxiliary controller 350 operates as a pass-through in particular operational state(s), such that the auxiliary controller 350 transmits control signals and feedback signals between the wind turbine controller 325 and the pitch control system 355 substantially without modification. In this way, the wind turbine controller 325 operates the pitch control system 355 during the operational state(s).

In other operational state(s) of the wind turbine 100, the auxiliary controller 350 receives (or "intercepts") a first control signal from the wind turbine controller 325, and transmits a second control signal to the pitch control system 355 according to the control scheme of the auxiliary controller 350. The auxiliary controller 350 receives a first feedback signal from the pitch control system 355, and transmits a second feedback signal to the wind turbine controller 325 in accordance with the first control signal. In these other operational state(s) of the wind turbine 100, the auxiliary controller 350 may be said to "intervene" in the control of the pitch control system 355.

In this way, the second feedback signal causes the wind turbine controller 325 to "observe" that the first control signal is being successfully implemented, which indicates to the wind turbine controller 325 that no further control adjustments are required. In some embodiments, the auxiliary controller 350 generates a synthetic feedback signal that is based on the first control signal received from the wind turbine controller 325. For example, assuming that the first control signal commands a pitch rate of +1°/second, the auxiliary controller 350 may return as the second feedback signal a pitch position that increases according to the commanded pitch rate. Thus, the auxiliary controller 350 is capable of independently controlling the pitch of the rotor blades 103, while the wind turbine controller 325 continues to control other operational aspects of the wind turbine 100, such as output power, a speed of the rotor 102, and so forth.

Operating the wind turbine 100 using the auxiliary controller 350 in conjunction with the wind turbine controller 325 allows the functionality of the wind turbine 100 to be extended. In some embodiments, the power system 305 may be constructed using components of multiple types without requiring modification, of the wind turbine controller 325. For example, the control scheme of the wind turbine controller 325 may be specific to a particular configuration of the power system 305 and would not be suitably productive and/or efficient for other configurations of the power system 305. Thus, the auxiliary controller 350 may enable retrofitting the wind turbine 100 to replace worn components and extend the lifetime of the wind turbine 100, to introduce components supporting greater power production, to introduce more efficient components, to implement more efficient control schemes, and so forth.

In some embodiments, the auxiliary controller 350 may provide additional control schemes or features beyond those of the wind turbine controller 325. For example, the auxiliary controller 350 may apply pitch modulation to the pitch control system 355, e.g., to reduce component loads of the wind turbine.

The operational states that are used to control the operation of the auxiliary controller 350 may be provided in any suitable form. In some embodiments, the operational states correspond to predefined control states that are defined by the wind turbine controller 325. Some examples of the control states include full-load operation (where the wind turbine 100 generates rated power as the wind speed at the wind turbine meets or exceeds a rated wind speed) and partial-load operation (where the wind turbine 100 generates less than the rated power as the wind speed is between a cut-in speed and the rated wind speed). In some embodiments, the operational states need not correspond to the predefined control states, but may represent different sets of values for one or more operational parameters of the wind turbine. The auxiliary controller 350 may receive sensor data from the one or more sensors 360, or from other sensors external to the one or more sensors 360, to determine the operational states.

In some embodiments, the auxiliary controller 350 is configured as a pass-through during full-load operation of the wind turbine 100, and allows the wind turbine controller 325 to control the pitch control system 355. During partial-load operation of the wind turbine 100, the auxiliary controller 350 "intervenes", providing the second control signal to the pitch control system 355 and a synthetic second feedback signal to the wind turbine controller 325.

In some embodiments, the auxiliary controller 350 is configured to intervene when sufficiently large loads on the one or more rotor blades 103 are measured to apply pitch modulation to the pitch control system 355. Generally, the pitch modulation may be applied during full-load or partial-load operation. In some embodiments, the pitch modulation is applied during full-load operation, and the auxiliary controller 350 applies pitch modulation values having a zero average so that the second feedback signal provided to the wind turbine controller 325 may be the same as the first feedback signal received from the pitch control system 355.

Figure 4:
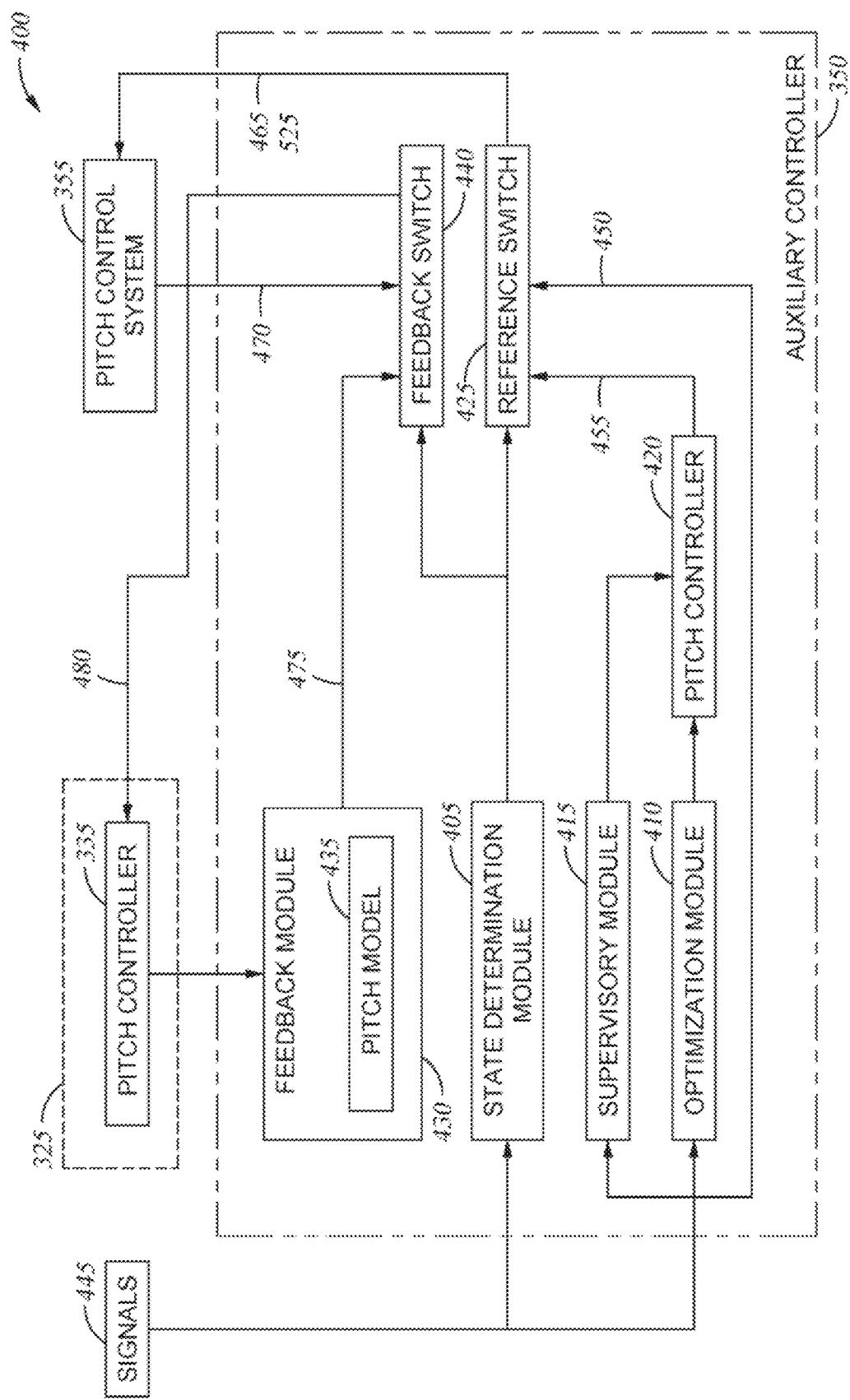
FIG. 4 is a block diagram of an auxiliary controller, according to one or more embodiments.

FIG. 4 is a block diagram 400 of the auxiliary controller 350. Although discussed in terms of controlling a pitch control system 355 of the wind turbine, other implementations of the auxiliary controller 350 are also contemplated, including implementations that control other control systems of the wind turbine.

As discussed above, the auxiliary controller 350 comprises one or more computer processors and a memory. The memory may include one or more modules for performing various functions described herein. In one embodiment, each module includes program code that is executable by the one or more computer processors of the auxiliary controller 350. In another embodiment, each module is partially or fully implemented in hardware (i.e., circuitry) or firmware of the auxiliary controller 350 (e.g., as circuitry within the one or more computer processors).

As shown, the auxiliary controller 350 comprises a state determination module 405, an optimization module 410, a supervisory module 415, and a feedback module 430. The auxiliary controller 350 further comprises a pitch controller 420, which may be implemented as a module, or as separate computer processor(s), of the auxiliary controller 350.

The state determination module 405 receives one or more signals 445, and determines an operational state of the wind turbine using the one or more signals 445. In some embodiments, the one or more signals 445 include sensor data for one or more environmental conditions and/or one or more operational conditions for the wind turbine. In some embodiments, the one or more signals 445 include a discrete signal from the wind turbine controller 325 indicating the operational state. In some embodiments, the one or more signals 445 include the control signal from the wind turbine controller 325 (e.g., the operational state is inferred from the control signal).

The optimization module 410 receives the one or more signals 445 and generates an optimized pitch signal for configuring the rotor blades with an optimal aerodynamic efficiency for the current environmental conditions (e.g., based on a wind speed, turbulence, and so forth). In some embodiments, the optimized pitch signal is based on an estimated tip speed ratio of the wind turbine. The optimized pitch signal is provided to the pitch controller 420.

The supervisory module 415 implements one or more rules to ensure a desired operation of the control system, e.g., it monitors a deviation of a measured pitch reference generated by the optimization module 410 or a deviation of pitch angle between rotor blades etc. In some embodiments, when operation of the control system is transitioned (or "returned") from the auxiliary controller 350 to the wind turbine controller 325, the supervisory module 415 provides one or transitional values to the pitch controller 420. For example, the supervisory module 415 may calculate a trajectory between a pitch reference 465 that is currently provided by the auxiliary controller 350 to the pitch control system 355, and a pitch reference 450 from the pitch controller 335 of the wind turbine controller 325. Including the transitional values in the pitch reference 465 can ensure a smooth transition as control returns to the wind turbine controller 325.

The pitch controller 420 generates a pitch reference 455 based on the optimized pitch signal from the optimization module 410. The pitch reference 455 and the pitch reference 450 from the pitch controller 335 are each provided to a reference switch 425. The reference switch 425 outputs, based on the operational state of the wind turbine indicated by the state determination module 405, the pitch reference 465 as a selected one of the pitch references 450, 455. The pitch reference 465 is then provided to operate the pitch control system 355.

During operation, the pitch control system 355 generates a feedback signal 470 that indicates the state of the pitch control system 355. In some embodiments, the pitch reference 465 provided to the pitch control system 355 comprises a pitch rate, and the feedback signal 470 comprises a pitch position.

The feedback module 430 receives the pitch reference 450 from the pitch controller 335, and generates a synthetic feedback signal 475 according to the pitch reference 450. In a simplified example, assuming that the pitch reference 450 commands a pitch rate of +1°/second, the synthetic feedback signal 475 includes values of a pitch position that increase according to the commanded pitch rate. In some embodiments, the feedback module 430 comprises a pitch model 435 that generates the synthetic feedback signal 475 by estimating a pitch position using a 3D table (having a control signal such as a control voltage, a pitch moment, and a pitch rate as the respective dimensions of the table) and the pitch reference 455 output by the pitch controller 420.

The feedback signal 470 and the synthetic feedback signal 475 are each provided to a feedback switch 440. The feedback switch 440 outputs, based on the operational state of the wind turbine indicated by the state determination module 405, a feedback signal 480 as a selected one of the feedback signal 470 and the synthetic feedback signal 475. The feedback signal 480 is then provided to the pitch controller 335.

Figure 5A:
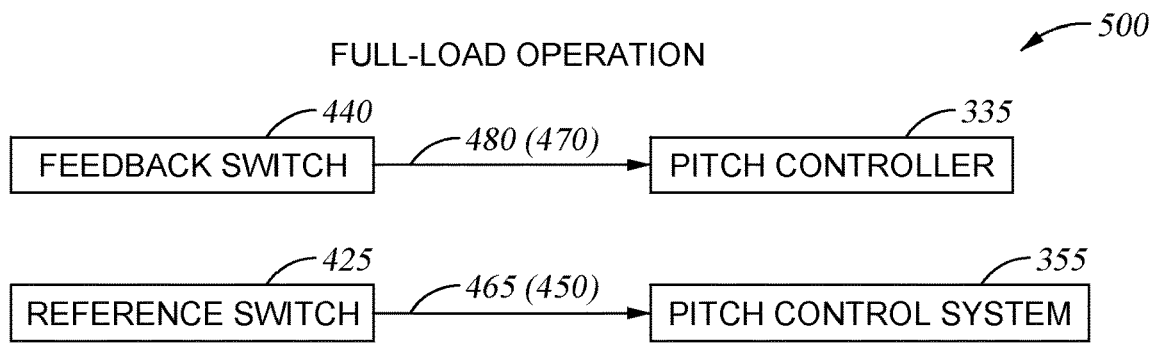
FIGS. 5A-5C illustrates exemplary control signals and feedback signals for different operational modes, according to one or more embodiments.
Figure 5B:
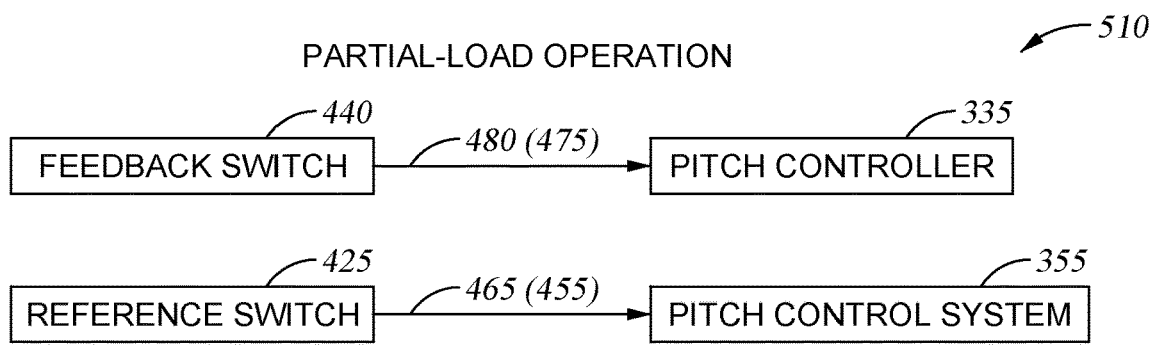
Figure 5C:
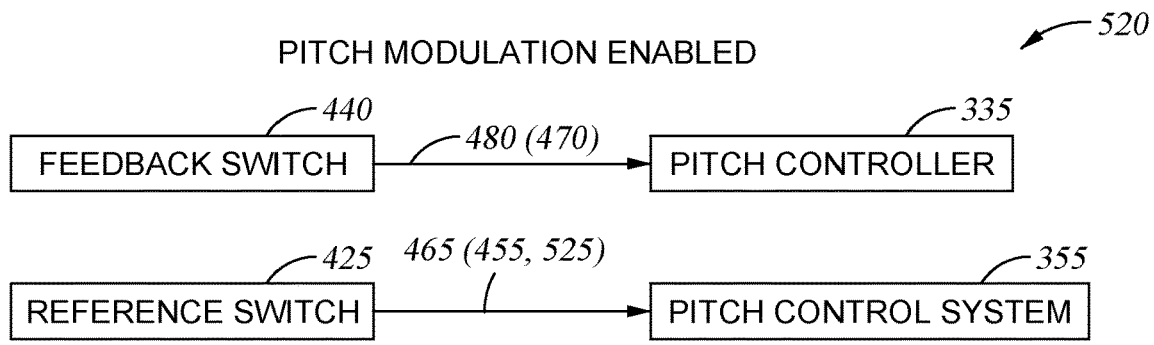

FIGS. 5A-5C illustrate exemplary control signals and feedback signals for different operational modes. More specifically, diagram 500 of FIG. 5A represents a first operational mode (full-load operation), diagram 510 of FIG. 5B represents a second operational mode (partial-load operation), and diagram 520 of FIG. 5C represents a third operational mode (pitch modulation enabled).

In diagram 500, the reference switch 425 outputs the pitch reference 450 from the wind turbine controller 325 as the pitch reference 465. The feedback switch 440 outputs the feedback signal 470 from the pitch control system 355 as the feedback signal 480. Thus, the wind turbine controller 325 controls the pitch control system 355 in the first operational mode without intervention by the auxiliary controller 350.

In diagram 510, the reference switch 425 outputs the pitch reference 455 from the auxiliary controller 350 as the pitch reference 465. The feedback switch 440 outputs the synthetic feedback signal 475 from the auxiliary controller 350 as the feedback signal 480. Thus, the auxiliary controller 350 controls the pitch control system 355 in the second operational mode, which is effectively imperceptible by the wind turbine controller 325.

In diagram 520, the auxiliary controller 350 adds a pitch modulation component 525 into the pitch reference 455, and the reference switch 425 outputs the pitch reference 455 as the pitch reference 465. In some embodiments, the pitch reference 455 is a sum of the pitch reference 450 received from the wind turbine controller 325 and the pitch modulation component 525. The pitch modulation may occur at any suitable power level of the wind turbine (e.g., partial-load operation, full-load operation, or overrated operation beyond the rated power of the wind turbine).

In some embodiments, the values of the pitch modulation component 525 have a zero average. Because of the zero average, the pitch modulation component 525 has a negligible effect on the feedback signal 470, and the feedback signal 470 may be selected by the feedback switch 440 as the feedback signal 480 without causing the wind turbine controller 325 to alter its control of the pitch control system 355.

Figure 6:
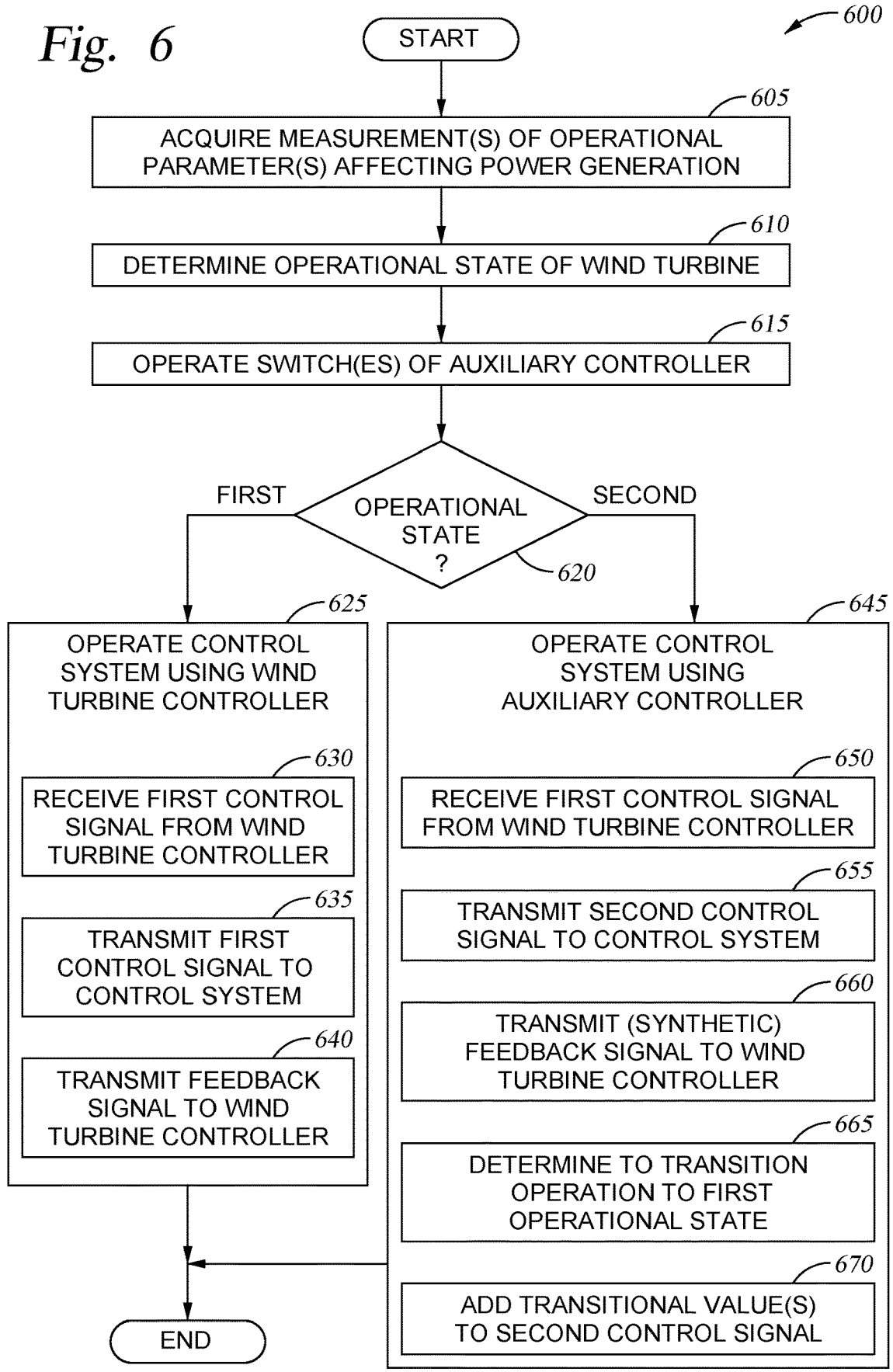
FIG. 6 is a method for use with a wind turbine comprising a wind turbine controller, according to one or more embodiments.

FIG. 6 is a method 600 for use with a wind turbine comprising a wind turbine controller. In some embodiments, the method 600 is performed by the auxiliary controller 350 depicted in FIGS. 3, 4.

The method 600 begins at block 605, where one or more measurements of one or more operational parameters of the wind turbine affecting power generation are acquired. At block 610, the operational state of the wind turbine is determined. In some embodiments, the operational state is determined using the one or more measurements. In other embodiments, the operational state is determined using other signal(s) from the wind turbine controller.

At block 615, one or more switches of the auxiliary controller are operated using the operational state. In some embodiments, the one or more switches comprise a reference switch that provides a reference to a control system of the wind turbine (such as a pitch control system) and/or a feedback switch that provides a feedback signal to the wind turbine controller.

At block 620, the method 600 branches based on which operational state was determined at block 610. The method 600 proceeds from block 620 to block 625 for a first operational state, and the control system is operated using the wind turbine controller. In some embodiments, the first operational state is full-load operation of the wind turbine. In some embodiments, operating the control system using the wind turbine controller comprises receiving a first control signal from the wind turbine controller (block 630), transmitting the first control signal to the control system (block 635), and transmitting a feedback signal to the wind turbine controller (block 640).

The method 600 proceeds from block 620 to block 645 for a second operational state, and the control system is operated using the auxiliary controller. In some embodiments, the second operational state is partial-load operation of the wind turbine. In some embodiments, operating the control system using the auxiliary controller comprises receiving the first control signal from the wind turbine controller (block 650), transmitting a second control signal to the control system (block 655), and transmitting a feedback signal to the wind turbine controller (block 660).

In some embodiments, the feedback signal is a synthetic feedback signal generated by the auxiliary controller. In some embodiments, generating the synthetic feedback signal comprises applying the first control signal, the second control signal, and/or other parameters to a pitch model.

In some embodiments, the second control signal is independent of the first control signal. For example, the second control signal may be determined using the control scheme of the auxiliary controller. In other embodiments, the second control signal depends on the first control signal. For example, the second control signal may be a sum of the first control signal and a modulation component (or other adjustment). In some embodiments, the second control signal is a pitch control signal, and the modulation component comprises pitch modulation values having a zero average.

In some embodiments, operating the control system using the auxiliary controller further comprises determining to transition operation to the first operational state (block 665) and adding one or more transitional values to the second control signal (block 670). The method 600 ends following completion of block 625 or block 645.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGs. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

The invention claimed is:

1. A method for use with a wind turbine comprising a wind turbine controller, the method comprising:
    determining the wind turbine to be in a first operational state;
    during the first operational state, operating a control system of the wind turbine using the wind turbine controller;
    determining the wind turbine to be in a second operational state; and
    during the second operational state, operating the control system using an auxiliary controller, wherein operating the control system using the auxiliary controller comprises:
        receiving a first control signal for the control system from the wind turbine controller;
        transmitting a feedback signal to the wind turbine controller in accordance with the first control signal;
        transmitting a second control signal to the control system as a substitute for the first control signal; and pitching at least one rotor blade of the wind turbine in accordance with the second control signal.

2. The method of claim 1, wherein the feedback signal is a synthetic feedback signal generated by the auxiliary controller.

3. The method of claim 2,
wherein the control system comprises a pitch control system, and
wherein, during the second operational state, the wind turbine controller controls one or both of an output power and a rotor speed of the wind turbine.

4. The method of claim 3,
wherein the first control signal is a pitch rate signal, and
wherein the synthetic feedback signal is a pitch position signal.

5. The method of claim 4, wherein generating the synthetic feedback signal comprises:
applying the pitch rate signal to a pitch model of the auxiliary controller to estimate values of the pitch position signal.

6. The method of claim 1, wherein determining an operational state of the wind turbine to be the first operational state or the second operational state comprises:
acquiring, using the auxiliary controller, one or more measurements of one or more operational parameters affecting power generation of the wind turbine; and
determining, based on the one or more measurements, the operational state using the auxiliary controller.

7. The method of claim 1, further comprising:
responsive to determining a transition from the second operational state to the first operational state, transitioning operation of the control system from the auxiliary controller to the wind turbine controller,
wherein transitioning operation of the control system comprises adding one or more transitional values to the second control signal.

8. The method of claim 1,
wherein the first operational state is full-load operation of the wind turbine, and
wherein the second operational state is partial-load operation of the wind turbine.

9. The method of claim 1,
wherein the feedback signal is received from the control system, and
wherein the second control signal comprises a pitch modulation component.

10. A wind turbine comprising:
a rotor having one or more rotor blades;
a generator coupled with the rotor;
a control system configured to alter one or more operational parameters affecting power generation of the wind turbine;
a wind turbine controller; and
an auxiliary controller arranged between the wind turbine controller and the control system, the auxiliary controller configured to:
receive, from the wind turbine controller, a first control signal for the control system;
determine the wind turbine to be in a first operational state;
during the first operational state of the wind turbine, output the first control signal to operate the control system;
determining the wind turbine to be in a second operational state; and
during the second operational state of the wind turbine:
transmit a feedback signal to the wind turbine controller in accordance with the first control signal; and
output a second control signal as a substitute for the first control signal to operate the control system; and
pitch at least one of the one or more rotor blades in accordance with the second control signal.

11. The wind turbine of claim 10, wherein the feedback signal is a synthetic feedback signal generated by the auxiliary controller.

12. The wind turbine of claim 10,
wherein the control system comprises a pitch control system, and
wherein, during the second operational state, the wind turbine controller controls one or both of an output power and a rotor speed of the wind turbine.

13. The wind turbine of claim 10,
wherein the first operational state is full-load operation of the wind turbine, and
wherein the second operational state is partial-load operation of the wind turbine.

14. The wind turbine of claim 10,
wherein the feedback signal is received from the control system, and
wherein the second control signal comprises a pitch modulation component.

15. The wind turbine of claim 10, wherein one or both of the rotor and the rotor blades are retrofitted to the wind turbine.

16. A computer program product comprising a non-transitory computer-readable media storing computer-readable code, which when executed by one or more computer processors of an auxiliary controller of a wind turbine, performs an operation comprising:
receiving, from a wind turbine controller, a first control signal for a control system of the wind turbine;
determining the wind turbine to be in a first operational state;
during the first operational state of the wind turbine, outputting the first control signal so that the wind turbine controller operates the control system;
determining the wind turbine to be in a second operational state; and
during the second operational state of the wind turbine:
transmitting a feedback signal to the wind turbine controller in accordance with the first control signal; and
outputting a second control signal as a substitute for the first control signal to operate the control system; and
pitching at least one rotor blade of the wind turbine in accordance with the second control signal.

17. The computer program product of claim 16, wherein the feedback signal is a synthetic feedback signal generated by the auxiliary controller.

18. The computer program product of claim 17,
wherein the control system comprises a pitch control system, and
wherein, during the second operational state, the wind turbine controller controls one or both of an output power and a rotor speed of the wind turbine.

19. The computer program product of claim 18,
wherein the first control signal is a pitch rate signal, and
wherein the synthetic feedback signal is a pitch position signal.

20. The computer program product of claim 19, wherein generating the synthetic feedback signal comprises:
applying the pitch rate signal to a pitch model of the auxiliary controller to estimate values of the pitch position signal.

\* \* \* \* \*